United States Patent [19]
Contin

[11] Patent Number: 4,904,141
[45] Date of Patent: Feb. 27, 1990

[54] MANIPULATING DEVICE FOR HIGH VACUUM CHAMBER

[75] Inventor: Jose L. Contin, Orinda, Calif.

[73] Assignee: MDC Vacuum Products Corporation, Foster City, Calif.

[21] Appl. No.: 114,543

[22] Filed: Oct. 28, 1987

[51] Int. Cl.$^4$ ............................................. B25J 3/00
[52] U.S. Cl. ........................................ 414/8; 74/18.1; 74/60
[58] Field of Search ................. 414/8, 2; 74/18, 18.1, 74/18.2, 60

[56] References Cited
U.S. PATENT DOCUMENTS

| | | | |
|---|---|---|---|
| 2,996,330 | 8/1961 | Hutto | 414/8 X |
| 3,426,920 | 2/1969 | Chesley | 414/8 |
| 3,625,378 | 12/1971 | Attiz | 414/8 |
| 4,030,615 | 6/1977 | Guggi et al. | 414/8 |
| 4,681,329 | 7/1987 | Contin | 277/167.5 |

OTHER PUBLICATIONS

Products Literature-Wobble Sticks, Brochure No. 04010979, revised 5-84, 4 pages, Vacuum Generators Limited, Hastings, East Sussex, England.

Primary Examiner—David A. Bucci
Assistant Examiner—Donald W. Underwood
Attorney, Agent, or Firm—David B. Harrison; Janet K. Castaneda

[57] ABSTRACT

A motion transmitting mechanism, for use as a sample manipulating device or wobble stick, is provided for transmitting manual movements through the wall of a vacuum vessel. The mechanism includes a central mounting flange for securing the mechanism in vacuum sealing arrangement with the vacuum vessel through a suitable orifice formed in the wall thereof. A spherical ball joint is moveably journalled within the mounting flange to enable the mechanism to be moved angularly relative to an axis perpendicular to the vacuum vessel wall throughout a predetermined range of limited angular displacement. A coaxial shaft assembly comprises an outer tube and a central shaft, the assembly being axially slideable through a central opening of the ball joint means to provide axial movements within the vacuum vessel throughout a predetermined range of limited axial displacement. A rotation imparting structure is connected to the coaxial shaft assembly for imparting unrestricted rotational movement to the central shaft relative to the outer tube. Extensible vacuum sealing baffles extend from the flange on the vacuum side of the mechanism and are connected to the rotation mechanism. The sealing baffles are provided for vacuum sealing of the interior of the coaxial shaft assembly. Axial displacement of the central shaft relative to the outer tube provides control for pincers which may be installed at the inner end of the mechanism.

10 Claims, 3 Drawing Sheets

MANIPULATING DEVICE FOR HIGH VACUUM CHAMBER

FIELD OF THE INVENTION

The present invention relates to high vacuum devices. More particularly, the present invention relates to a mechanism for manually transmitting longitudinal, angular and rotational movements from the external ambient through the wall of a high vacuum vessel to the interior thereof.

BACKGROUND OF THE INVENTION

Many manufacturing processes and steps are carried out in high vacuum environments at wide ranges of temperatures and internal conditions. Ionic sputtering processes and optical coating processes are examples of high vacuum processing of materials. Typically, materials or specimens to be processed are contained within trays, carousels, cassettes or other carriers within the high vacuum chamber. During process steps within a high vacuum environment, often it is necessary to manipulate a specimen or its carrier in order to move the specimen from one process step to another, or to move the specimen into a viewing position, or to carry out other useful tasks within the high vacuum environment.

Heretofore, devices have been proposed for providing relatively simple mechanical movements to be transmitted through a wall of a vacuum vessel. These movement-providing, sample manipulating devices, referred to in the art as "wobble sticks", are typically adapted for handling specimens, samples or the like; or, for operating mechanisms within the vacuum chamber, such as shutters, adjustment probes, and variable orifices. Wobble sticks have typically been gimble mounted rods which pass through a mounting flange affixed in sealing arrangement to the wall of the vessel. Typically, such rods have permitted some limited relative axial movement and some limited angular displacement. Usually, axial movement has been limited to about twelve centimeters or less, and angular movement has been limited to about plus or minus twenty degrees from perpendicular to the vessel wall. Some limited range of rotation has also been provided in prior art wobble sticks. Unrestricted, multi-revolution rotation has not been available heretofore.

One source of prior art wobble sticks is Vacuum Generators Limited, Menzies Road, Hastings, East Sussex TN341YQ, England. Their models WS2, WS50, WS120, WS75PG, and WS50FG are examples of the state of the prior art and are described in a Vacuum Generators Limited brochure, number 04 010 979 (revised 5/84), reference to which is made for further particulars.

As described in the referenced brochure, there are three distinct types of prior art wobble sticks. One conventional type is a simple, single bellows and plunger mechanism without a sample holder, such as the model WS2. A universal type is provided with a double bellows and plunger arrangement so as to be used with a particular design of holder to lift and carry a specimen within the vacuum system, such as the models WS50 and WS120. A third, or double acting, type incorporates a third bellows mechanism and a co-axial actuator. This prior design enabled the specimen to be gripped by jaws at the interior end of the wobble stick which were releasable from the ambient via coaxial manual actuation.

While some limited rotational capability was provided by the prior art wobble sticks, the prior art units were not freely rotatable from the ambient over an unlimited range of rotational movement. One reason for this limitation has been the necessity of bellows which have been required in order to effectuate a positive high vacuum seal between the wobble stick and the ambient. Another limitation has been the relatively limited range of axial (longitudinal) displacement which limited he effective range of usefulness of the wobble stick.

SUMMARY OF THE INVENTION WITH OBJECTS

A general object of the present invention is to provide a mechanism or device for transmitting manually a variety of different mechanical movements through the wall of a high vacuum vessel which overcomes limitations and drawbacks of the prior art.

A specific object of the present invention is to provide a mechanism, such as a sample manipulating device, which transmits an unrestricted, multiple revolution rotational movement from an outside ambient to the interior of a high vacuum vessel or chamber.

Another object of the present invention is to provide a mechanism which is capable of transmitting an increased range of axial movement from the ambient to the inside environment of a vacuum chamber.

One more object of the present invention is to provide a sample manipulating device which provides a calibrated vernier dial indicator external to the vacuum chamber for indicating rotational movements and displacements transmitted into the vacuum chamber from the outside.

In accordance with the principles of the present invention, a mechanism, for use as a sample manipulating device or wobble stick, is provided for transmitting manual movements through the wall of a vacuum vessel. The device includes a central mounting flange for securing the device in vacuum sealing arrangement with the vacuum vessel through a suitable orifice formed in the wall thereof. A spherical ball joint is moveably journalled within the mounting flange to enable the device to be moved angularly relative to an axis perpendicular to the vacuum vessel wall throughout a predetermined range of limited angular displacement. A coaxial shaft assembly comprises an outer tube and a central shaft, the assembly being axially slideable through a central opening of the ball joint means to provide axial movements within the vacuum vessel throughout a predetermined range of limited axial displacement. A rotation is connected to the coaxial shaft assembly for imparting unrestricted rotational movement to the central shaft relative to the outer tube. Extensible vacuum sealing baffles extend from the flange on the vacuum side of the device and are connected to the rotation mechanism. The sealing baffles extend from the flange on the vacuum coaxial shaft assembly.

In one aspect of the present invention, an axial displacement mechanism is connected to the central shaft of the coaxial shaft assembly for imparting axial displacement to the central shaft relative to the outer tube.

In a second aspect of the present invention a gripping mechanism is secured to an interior end of the central shaft and is rotatably journalled to an interior end of the outer tube. The gripping mechanism includes opposed gripping surfaces, one of which may be fixed and the other of which may be operated in response to axial displacement of the central shaft relative to the outer tube. The gripping mechanism rotates with the rotational movement imparted to the central shaft by the rotation mechanism. The gripping mechanism is axially displaced as the coaxial assembly moves axially through the ball joint, and the gripping mechanism is angularly displaced as the ball joint is rotated relative to the mounting flange, In a third aspect of the present invention, the rotation mechanism comprises a housing secured to an outer end of the outer tube. The housing contains a cam follower dog shaft structure which is rotationally fixed to the outer tube by a vacuum sealing baffles arrangement but which moves eccentrically relative to the longitudinal axis of the central shaft and translates the eccentric movement into unrestricted rotational movement of the central shaft as a follower end of the dog shaft structure follows a camming surface of a U-shaped camming structure.

In a fourth aspect of the present invention, the housing further includes a central shaft extension rotationally secured to the dog shaft structure in axial alignment with the main longitudianl axis of the central shaft. The shaft extension is adapted to engage and axially displace the dog shaft structure, thereby axially displacing the central shaft relative to the outer tube. As the dog shaft structure becomes axially displaced it continues to follow the camming surface of the U-shaped camming structure.

In a fifth aspect of the present invention the bellows effectively extends within the housing from the outer end of the outer tube to the dog shaft structure.

In a sixth aspect of the present invention the axial displacement mechanism connected to the central shaft of the coaxial shaft assembly comprises a spring loaded handle assembly enabling application of manual actuation force in order to overcome spring preload in order to impart axial displacement to the central shaft relative to the outer tube.

In a seventh aspect of the present invention the spring loaded handle assembly includes an outer longitudinal tube rotatably journalled to the rotation mechanism. A tee-grip is connected to the central shaft and it extends through opposed axial slots of the longitudinal tube. A ball handle is fixed to an outer end of the longitudinal tube, and a loading spring is provided for axially preloading the central shaft so that the tee-grip is spring biased away from the ball handle.

In an eighth aspect of the present invention the extensible vacuum sealing baffle structure extends from the flange on the vacuum side thereof to a fitting secured to the interior end of the outer tube. The fitting provides at least one air flow passage from a space in the coaxial shaft assembly between the central shaft and an inside wall of the outer tube, thereby to facilitate evacuation of air from inside of the coaxial shaft assembly.

In a ninth aspect of the present invention, a vernier dial indicator is provided with suitable indicia for indicating the rotational position of the central shaft relative to the outer tube.

These and other objects, advantages and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
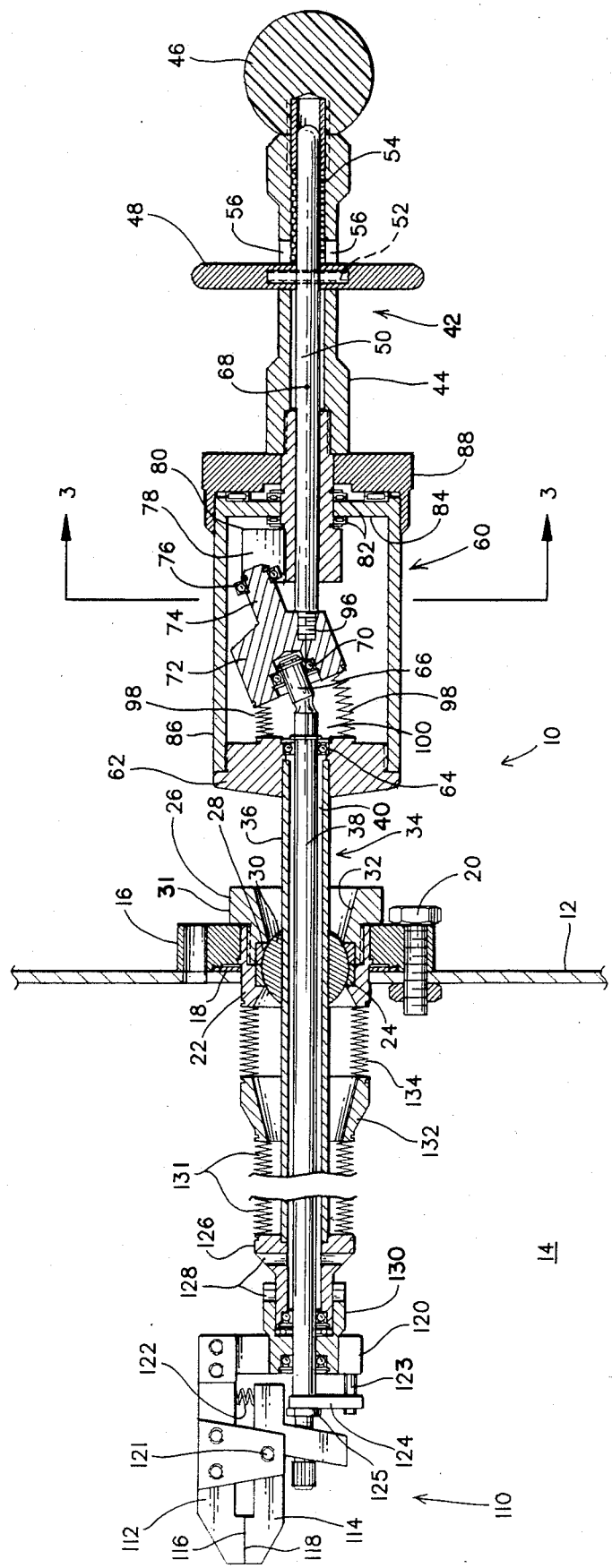
FIG. 1 is a diagrammatic view in section and side elevation of a sample manipulating device in accordance with the principles of the present invention.

A high vacuum manual movement-transmitting mechanism, such as a sample manipulating device or wobble stick 10, . incorporating the principles of the present invention is depicted in the figures. Therein, the device 10 is secured to a sidewall 12 of a high vacuum vessel (only a portion of the wall 12 thereof being shown in FIG. 1). The vessel includes an interior space 14 which is highly evacuated of air molecules and may be at, above, or below ambient temperature, depending upon the nature of the process being performed within the vacuum vessel.

The sample manipulating device 10 is secured to the sidewall 12 by a flange 16 which may be annular or rectangular. A ductile copper high vacuum seal 18 is provided between the flange 16 and the sidewall 12 in accordance with principles disclosed in commonly assigned U.S. Pat. No. 4,681,329, reference to which is made for further particulars. Bolts 20 are provided to secure the flange 16 to the sidewall 12 in conventional fashion.

The flange 16 includes a central annular opening containing a cylindrical fitting 22 having an annular bushing 24. A cylindrical threaded fitting 26 is provided with male threads which thread into female threads of the fitting 22. The fitting 26 also has an annular bushing 28. A spherical ball joint 30 is placed between the bushes 24 and 28. When the threaded fitting 26 is tightened into the fitting 22, the bushes 24 and 26 clamp and hold the ball joint in a fixed orientation relative to the flange 16 and sidewall 12. An outer cylindrical surface 31 of the fitting 26 may be knurled so as to enable release of the fitting 26 and repositioning of the ball joint 30 throughout the range of available axial movement of the device 10.

An interior cone-shaped sidewall 32 of the threaded fitting 26 enables a longitudinal shaft assembly 34 slidably passing through the ball joint 30 to enjoy a range of limited angular displacement relative to an axis of the fittings 22 and 26 which is perpendicular to the sidewall 12. Approximately 30 degrees of angular displacement in any direction relative to the axis of the fittings 22 and 26 is provided by the ball joint arrangement of the device 10 as depicted in FIG. 1.

The longitudinal shaft assembly 34 includes a fixed outer tube 36 and a central shaft 38. The diameter of the shaft 38 is smaller than the inside diameter of the tube 36, so that a cylindrical air passage 40 is provided throughout the length of the shaft assembly 34 to facilitate evacuation. The passage 40 is a high vacuum region of the device 10.

An exterior end of the outer tube 36 terminates at a handle assembly 42 of the device 10. The handle assembly 42 includes an outer cylindrical housing 44, a ball grip 46 and a spring-loaded cylindrical finger pull bar 48. The pull bar 48 is secured to a central shaft extension 50 by a pin 52. A spring 54 preloads the pull bar 48 and biases it away from the ball grip 46. Two opposite slots 56 through the housing 44 enable the pull bar 48 to be pulled manually backward to a limited extent of axial displacement, about one quarter inch. This limited displacement is transmitted to the central shaft extension and ultimately to the central shaft 38, so that it moves relative to the outer tube 36.

The handle assembly 42 also includes a rotation mechanism 60 located between the outer cylindrical housing 44 and the outer end of the longitudinal shaft assembly 34. The outer tube 36 is press fit into a central opening of an annular endpiece 62 in vacuum sealing arrangement therewith. A roller bearing 64 seats in the central opening of the endpiece 62 and journals the outer end of the central shaft 38. The central shaft 38 includes an angled portion 66 which is bent approximately twenty two degrees relative to a longitudinal axis 68 of the central shaft 38. The axis 68 of the central shaft 38 is also the longitudinal axis of the central shaft extension 50 in the handle assembly 42.

Figure 2:
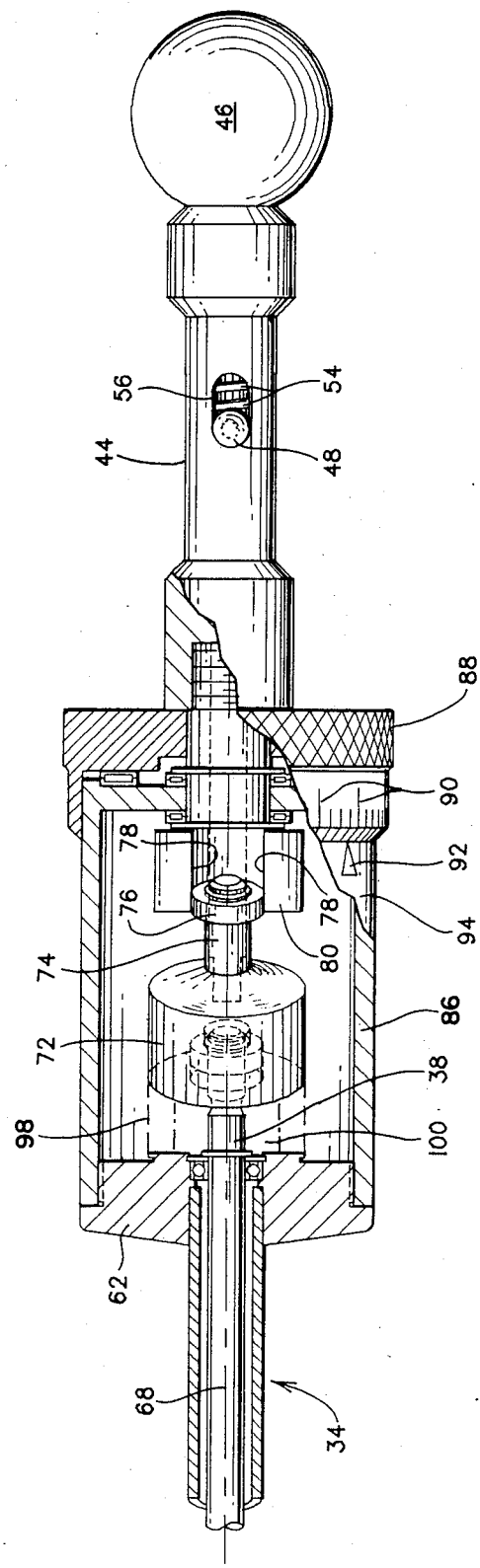
FIG. 2 is an enlarged diagrammatic view in section and side elevation of a portion of the sample manipulating device of FIG. 1 further illustrative of operation of the unrestricted rotation mechanism thereof.
Figure 3:
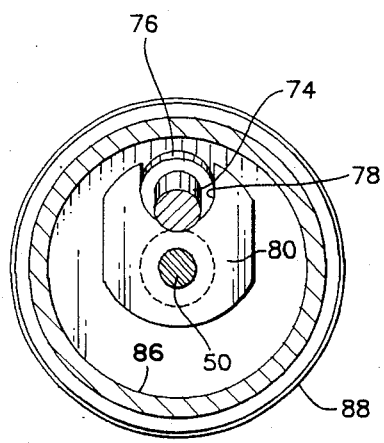
FIG. 3 is a sectional view in elevation taken along the line 3—3 in FIG. 1.

The angled portion 66 includes a bearing 70 at an end thereof. The bearing 70 is seated in a well defined within a cam follower dog shaft structure 72. The dog shaft 72 includes a dog shaft 74 on an axis of 22° relative to the axis 68. A follower bearing 76 is fixed to the dog shaft 74 at a rearward end thereof as shown in FIG. 2. The bearing 76 follows a generally U-shaped (see FIG. 3) camming surface 78 (see FIG. 2) of a rotatable cam structure 80. The structure 80 is journalled by bearings 82 to an endwall 84 of a cylindrical housing 86 which encloses the dog shaft structure 72 and related elements, as shown in FIG. 1.

A shaft portion of the cam structure 80 is press fit into a central end opening of the outer housing 44. A knurled, cylindrically flanged, vernier dial indicator 88 is also press fit onto the shaft portion of the cam structure 80. Suitable calibration marks 90 are provided on the vernier dial 88 relative to a reference marker 92 on an outside cylindrical wall 94 of the housing 86 (FIG. 2). The outer housing 44, vernier dial 88 and cam structure 80 all rotate in common relative to the housing 86 and outer tube 36 of the shaft assembly 34. Since the central shaft extension 50 is fixed to so as to rotate with the housing 44 by virtue of the finger pull bar 48 and slots 56, the central shaft extension 50 rotates in common as the outer housing 44, etc., is rotated as a unit. However, as already explained, the central shaft extension is adapted to be displaced axially relative to the outer housing 44 as the finger pull bar 48 is pulled backwardly against the spring preload.

An interior end portion 96 of the central shaft extension 50 is secured to a well defined in the cam follower dog shaft structure 72 as best shown in FIG. 1, so that, as the central shaft extension 50 is axially displaced, such displacement is transmitted to the cam follower dog shaft structure 72 and it is pulled backward, causing the follower bearing 76 to slide inwardly on the cam surface 78 of the cam structure 80.

Independently of the axial displacement of the cam follower dog shaft structure 72, as the cam structure 80 is rotated, the follower bearing 76 follows the the cam surface 78 which causes the cam follower dog shaft structure 72 to follow the rotation of the structure 80 in a circular motion which is eccentric relative to the main longitudinal axis 68 of the central shaft 38. This motion is thereupon transmitted to the angled portion 66 of the central shaft 38, and the shaft 38 likewise follows the rotation caused by eccentric movement of the dog shaft structure 72.

A bellows assembly 98 seals the well end of the cam follower dog shaft structure 72 to the endpiece 62. The space 100 inside of the bellows assembly 98 is high vacuum, while the space on the outside of the bellows assembly 98 is ambient. While the cam follower dog shaft structure 72 moves eccentrically as the cam structure 80 rotates, the dog shaft structure 72 itself does not rotate relative to the main axis 68. Rather, it is held in fixed position relative to the shaft assembly 34 by being sealed by the bellows assembly 98 to the outer tube 36. As structure 80 rotates, the offset cam follower bearing 76 follows the rotational movement of the structure 80 and translates its rotation into a circular displacement of the angled dog shaft structure 72. Structure 72 does not rotate, but rather assumes an axially displaced, circular cranking pattern or locus of motion which follows in space the rotation of the structure 80. This axially fixed, cranking motion, eccentric in relation to longitudinal axis 68, is translated into rotational motion of the central shaft 38 by virtue of displacement of the angled portion 66 thereof. Thus, it will be appreciated that the rotation mechanism 60 is capable of imparting unrestricted multi-revolution rotational movement to the central shaft 38 within the high vacuum environment while still achieving and maintaining a high vacuum seal relative to the ambient.

Figure 4:
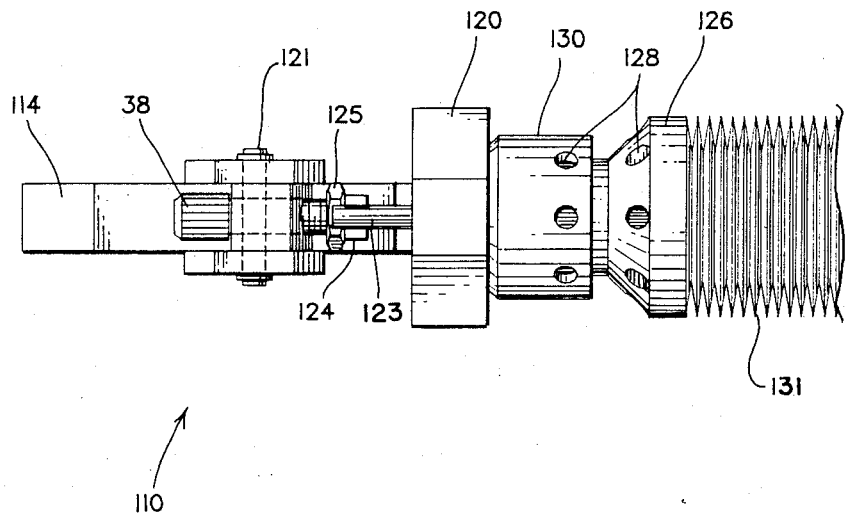
FIG. 4 is an enlarged bottom plan view of the pincer head gripping mechanism fitted onto an interior end of the device of FIG. 1.

Any number of useful head end appliances may be affixed to the device 10. A presently preferred appliance is a pincer structure 110 which includes a fixed jaw 112 and a pivotable jaw 114 (see FIGS. 1 and 4). Opposed surfaces 116 and 118 of the jaws 112 and 114 enable e.g. samples to be gripped within the high vacuum environment 14. The pivotable jaw 114 pivots about a pivot pin 121. A load spring 122 preloads the pivotable jaw 114 with a bias force to urge the surfaces 116 and 118 together.

An extension lever 124 of the pivotable jaw 114 is adjustably connected to the central shaft 38, so that as the central shaft 38 is displaced axially, as already explained, the pivotable jaw 114 is opened relative to the fixed jaw, thereby enabling an article, sample, etc., to be grasped between the surfaces 116 and 118 as the finger pull bar 48 is pulled backward.

A rotating mounting structure 120 is provided for mounting the jaws 112 and 114. The structure 120 includes a guide pin 122 extending parallel with the central shaft 38. A slider 124 is secured to a threaded inner end portion of the central shaft by a nut 125, and the pin 122 follows the slider 124. Thus, as the central shaft 38 is rotated, this rotational movement is transmitted to the mounting structure 120.

A flanged fitting 126 secured to the inner end of the outer tube 36 provides a bearing journal for the rotating mounting structure 120. Holes 128 in the fitting 126 and 130 in the structure 120 facilitate evacuation of air from the device 10 as the vacuum vessel is evacuated.

An axial displacement bellows assembly 130 extends from the fitting 126 to a second fitting 132. An angular displacement bellows assembly 134 extends from the second fitting to the inside wall of the cylindrical fitting 22 within the mounting flange 16. Thus, it will be apparent to those skilled in the art that the bellows assemblies 130, 134 and 98 provide a positive vacuum seal of the interior 40 of the shaft assembly 34 relative to the ambient. At the same time, unrestricted rotational movement is provided by virtue of the axially fixed, eccentrically moving cam follower dog shaft structure 72 of the rotation mechanism 60; and, all of the other features of the device, including axial displacement, angular displacement and relative axial displacement, to actuate e.g. the pincer jaw 114, are provided by the device 10.

The components of the device 10 may be formed of materials which are compatible with the processes ongoing within the high vacuum environment 14. Machined stainless steel alloy is a preferred material.

To those skilled in the art to which the present invention pertains, many changes in construction and widely varying embodiments and applications of the invention will suggest themselves without departing from the spirit and scope of this invention as more particularly specified by the following claims. The disclosures and the description herein are purely illustrative and are not intended in any sense to be limiting of the scope of this invention.

I claim:

1. A motion transmitting mechanism for transmitting manual movements through the wall of a high vacuum vessel, the mechanism including:
   a central mounting flange for securing the mechanism in vacuum sealing arrangement with said vessel through a suitable orifice formed in the wall thereof,
   ball joint means movably journalled within said mounting flange to enable said mechanism to be moved angularly relative to said vacuum vessel wall through a predetermined range of limited angular displacement,
   a coaxial shaft assembly comprising an outer tube and a central shaft, the assembly being axially slidable through a central opening of said ball joint means to enable axial movements of said mechanism to be transmitted within said vacuum vessel throughout a predetermined range of limited axial displacement,
   rotation means connected to said coaxial shaft assembly for imparting unrestricted multi-revolution rotational movement to the central shaft relative to the outer tube, and
   extensible vacuum sealing means including said outer tube and extending from said flange on the vacuum side thereof and being completed at said rotation means, for vacuum sealing the interior of said coaxial shaft assembly from the ambient.

2. The motion transmitting mechanism as set forth in claim 1 further comprising axial relative displacement means connected to said central shaft of said coaxial shaft assembly for imparting axial displacement to the central shaft relative to the outer tube.

3. The motion transmitting mechanism as set forth in claim 2 further comprising gripping means secured to an interior end of said central shaft and rotatably journalled to an interior end of said outer tube, said gripping means including a gripping surface operated in response to said axial displacement of the central shaft relative to the outer tube, said gripping means rotating with said rotational movement imparted to the central shaft by said rotation means, said gripping means being axially displaced as set coaxial assembly moves axially through said ball joint means, and said gripping means being angularly displaced as said ball joint means is rotated relative to said mounting flange.

4. The motion transmitting mechanism as set forth in claim 1 wherein said rotation means comprises a housing fixed to an outer end of said outer tube by press fitting means, said housing containing a dog-shaft structure having a major axis extending from said central shaft at a predetermined angular displacement from the main axis of said central shaft and including a cam follower at an end thereof for following a camming surface of a camming structure which is manually rotatable by the user whereby the dog shaft structure moves eccentrically relative to the longitudinal axis of the central shaft and translates the eccentric movement into unrestricted rotational movement of the central shaft as the cam follower follows the rotational movement of the camming structure.

5. The motion transmitting mechanism as set forth in claim 2 wherein said rotation means comprises a housing fixed to an outer end of said outer tube by press fitting means, said housing containing a dog-shaft structure having a major axis extending from said central shaft at a predetermined angular displacement from the main axis of said central shaft and including a cam follower at an end thereof for following a camming surface of a camming structure which is manually rotatable by the user whereby the dog shaft structure moves eccentrically relative to the longitudinal axis of the central shaft and translates the eccentric movement into unrestricted rotational movement of the central shaft as the cam follower follows the rotational movement of the camming structure and further comprising a central shaft extension rotationally secured to the dog shaft structure in axial alignment with the main longitudinal axis of the central shaft, said shaft extension comprising the relative displacement means and axially displacing the dog shaft structure, thereby axially displacing the central shaft relative to the outer tube.

6. The motion transmitting mechanism as set forth in claim 2 wherein said axial relative displacement means connected to said central shaft of said coaxial shaft assembly comprises a spring loaded handle assembly enabling application of manual force to overcome spring preload in order to impart axial displacement to the central shaft relative to the outer tube.

7. The motion transmitting mechanism as set forth in claim 6 wherein said spring loaded handle assembly includes an outer longitudinal tube rotatably journalled to said rotation means, a finger pull tee-grip connected to said central shaft and extending through opposed axial slots of said longitudinal tube, a ball handle fixed to an outer end of said longitudinal tube, and a loading spring for preloading said central shaft so that said tee-grip is spring biased away from said ball handle.

8. The motion transmitting mechanism as set forth in claim 1 wherein said extensible vacuum sealing means further comprises baffle means extending from said flange on the vacuum side thereof to a fitting secured to the interior end of said outer tube, said fitting providing at least one air flow passage from a space in said coaxial shaft assembly between the central shaft and an inside wall of said outer tube, thereby to facilitate evacuation of air from inside of said coaxial shaft assembly.

9. The motion transmitting mechanism as as set forth in claim 8 wherein said central shaft is journalled for unrestricted rotation at said fitting.

10. The motion transmitting mechanism as set forth in claim 1 further comprising calibrated dial indicator means attached to the rotation means for indicating rotational movement of said central shaft relative to said outer tube.

* * * * *